(12) United States Patent
Yoshida et al.

(10) Patent No.: US 9,819,252 B2
(45) Date of Patent: Nov. 14, 2017

(54) METHOD OF MOLDING RESIN CASING AND MOTOR

(71) Applicant: Nidec Techno Motor Corporation, Minami-ku, Kyoto (JP)

(72) Inventors: Tatsuya Yoshida, Kyoto (JP); Yasuyuki Arai, Kyoto (JP); Satoru Yamamoto, Kyoto (JP)

(73) Assignee: NIDEC TECHNO MOTOR CORPORATION, Kyoto (JP)

( * ) Notice: Subject to any disclaimer, the term of this patent is extended or adjusted under 35 U.S.C. 154(b) by 285 days.

(21) Appl. No.: 14/596,583

(22) Filed: Jan. 14, 2015

(65) Prior Publication Data

US 2015/0229192 A1 Aug. 13, 2015

(30) Foreign Application Priority Data

Feb. 12, 2014 (JP) .................................. 2014-023978

(51) Int. Cl.
*H02K 5/02* (2006.01)
*H02K 15/14* (2006.01)
(Continued)

(52) U.S. Cl.
CPC ............... *H02K 15/14* (2013.01); *H02K 5/08* (2013.01); *H02K 5/1732* (2013.01)

(58) Field of Classification Search
CPC .. H02K 5/02; H02K 5/04; H02K 5/08; H02K 5/12; H02K 5/128; H02K 5/1285;
(Continued)

(56) References Cited

U.S. PATENT DOCUMENTS 3,638,055 A * 1/1972 Zimmermann ........ H02K 5/128
264/272.19
4,048,530 A * 9/1977 Kaufman, Jr. ........... H02K 5/04
310/43
(Continued)

FOREIGN PATENT DOCUMENTS

JP 2001268862 A 9/2001
JP 2005238461 A 9/2005
(Continued)

OTHER PUBLICATIONS

Japan Patent Office (JPO) JP Office Action corresponding to Application No. 2014-023978; dated Aug. 22, 2017.

*Primary Examiner* — Tran Nguyen
(74) *Attorney, Agent, or Firm* — Cantor Colburn LLP

(57) ABSTRACT

A method of molding a resin casing covering a stator of a motor may include preparing first and second molds; disposing the stator in the first mold; combining the molds; pouring a resin into the cavity; curing the resin; separating the molds; and taking the stator and resin casing from the mold. The stator may include a core, an insulator, and a coil. The core may include a core back surrounding and teeth that extend inward from the core back. The insulator may include wall portions inside the coil. The wall portions may be provided around the teeth and extend toward one side in an axial direction. One of the molds may include cylindrical surfaces contacting inner end faces of the teeth. The first mold may include wall supporting surfaces contacting or facing the inner surfaces of the wall portions. The wall supporting surfaces may be outside the cylindrical surfaces.

2 Claims, 14 Drawing Sheets

(51) Int. Cl.
*H02K 5/08* (2006.01)
*H02K 5/173* (2006.01)

(58) Field of Classification Search
CPC .. H02K 5/14; H02K 5/15; H02K 5/16; H02K 5/17; H02K 5/173; H02K 5/1732; H02K 5/22; H02K 5/225; H02K 9/22; H02K 15/12
USPC .............. 310/43, 89, 194; 264/272.19, 272.2
See application file for complete search history.

(56) References Cited

U.S. PATENT DOCUMENTS

| | | | | |
|---|---|---|---|---|
| 5,982,057 | A | * 11/1999 | Imada | H02K 5/02 310/43 |
| 6,002,185 | A | * 12/1999 | Nakao | H02K 5/08 264/272.19 |
| 7,888,833 | B2 | * 2/2011 | Okada | H02K 5/08 310/43 |
| 2010/0079014 | A1 | * 4/2010 | Miyashita | H02K 5/08 310/43 |
| 2015/0229191 | A1 | * 8/2015 | Yoshida | H02K 5/08 310/43 |

FOREIGN PATENT DOCUMENTS

| | | |
|---|---|---|
| JP | 2006174594 A | 6/2006 |
| JP | 2008109848 A | 5/2008 |

\* cited by examiner

METHOD OF MOLDING RESIN CASING AND MOTOR

CROSS REFERENCE TO RELATED APPLICATION

The present invention claims priority under 35 U.S.C. §119 to Japanese Application No. 2014-023978 filed Feb. 12, 2014, the entire content of which is incorporated herein by reference.

BACKGROUND

1. Field of the Invention

The present invention relates to a method of molding a resin casing that partially covers at least a stator of a motor, and a motor.

2. Description of the Related Art

A molded motor has been known in the past. The molded motor includes a housing in which a stator is embedded and which is made of a resin. A rotor is disposed in the housing. The molded motor is excellent in terms of the waterproof property of the stator and vibration resistance and a sound insulating property when the motor is driven.

For example, Japanese Unexamined Patent Application Publication No. 2001-268862 discloses a molded motor in the related art. Japanese Unexamined Patent Application Publication No. 2001-268862 discloses a method that holds a core by stepped portions formed at the center core of a mold and performs molding (Paragraph No. [0004] and FIG. 3).

In FIG. 3 of Japanese Unexamined Patent Application Publication No. 2001-268862, inner end faces of teeth protrude inward from an insulator. Further, the portions, which protrude inward from the insulator, of the teeth are placed on stepped surfaces of the center core of the mold. Further, to facilitate the insertion of the stator into the mold, a small gap is formed between an outer peripheral surface, which is present below the stepped portions of the center core of the mold, and the insulator.

However, the thickness of a resin formed between the center core of the mold and the insulator is small in this structure. In particular, if the insulator is inclined toward the center core of the mold due to the pressure of the resin that is in a flowing state when molding is performed, the resin between the center core of the mold and the insulator becomes thinner. The thinner resin is likely to peel from the insulator. Further, if the resin peels from the insulator, the peeled resin comes into contact with the rotor and noise or failure may be caused.

At least an embodiment of the invention provides a molding method and the structure of a motor that can suppress inward inclination of wall portions of an insulator in a radial direction during the molding of a resin casing.

SUMMARY

According to at least an embodiment of the present invention, there is provided a method of molding a resin casing that partially covers at least a stator of a motor. The method includes steps of: a) preparing first and second molds in which a cavity is formed when the first and second molds are combined with each other; b) disposing the stator in the first mold; c) combining the first and second molds so that the stator is received in the cavity; d) pouring a resin, which is in a flow state, into the cavity; e) obtaining the resin casing by curing the resin that is in a flow state; f) separating the first mold from the second mold; and g) taking the stator and the resin casing out of the first mold. The stator includes a stator core, an insulator, and a coil. The stator core includes an annular core back that surrounds a center axis and a plurality of teeth that extend inward from the core back in a radial direction. The insulator is mounted on at least the teeth. The coil is formed of a conducting wire that is wound on the insulator. The insulator includes wall portions that are positioned inside the coil in the radial direction. The wall portions are provided around the teeth and extend toward at least one side in an axial direction. Radially inner end portions of the teeth protrude inward from radially inner surfaces of the wall portions in the radial direction. At least one of the first and second molds includes cylindrical surfaces that come into contact with radially inner end faces of the teeth. The first mold includes wall supporting surfaces that come into contact with or face the radially inner surfaces of the wall portions in the radial direction. The wall supporting surfaces are positioned outside the cylindrical surfaces in the radial direction.

According to at least an embodiment of the present invention, there is provided a motor comprising: a stator; and a resin casing that partially covers at least the stator. The stator includes a stator core, an insulator, and a coil. The stator core includes an annular core back that surrounds a center axis and a plurality of teeth that extend inward from the core back in a radial direction. The insulator is mounted on at least the teeth. The coil is formed of a conducting wire that is wound on the insulator. The insulator includes wall portions that are positioned inside the coil in the radial direction. The wall portions are provided around the teeth and extend toward at least one side in an axial direction. Radially inner end portions of the teeth protrude inward from radially inner surfaces of the wall portions in the radial direction. The resin casing includes wall covering portions that cover the radially inner surfaces of the wall portions. The wall covering portions include mold marks that are recessed from radially inner surfaces thereof toward the outside in the radial direction. The mold marks reach the outside of at least radially inner end faces of the teeth in the radial direction.

According to at least an embodiment of the present invention, since the wall portions come into contact with the wall supporting surfaces even though the wall portions of the insulator are to collapse inward in the radial direction due to the pressure of the resin that is in a flowing state, the inward inclination of the wall portions in the radial direction is suppressed.

According to at least an embodiment of the present invention, it is possible to suppress the inward inclination of the wall portions in the radial direction during the molding of the resin casing.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE EMBODIMENTS

Exemplary embodiments of the invention will be described below with reference to the drawings. Meanwhile, in this specification, a direction parallel to a center axis of a motor is referred to as an "axial direction", a direction orthogonal to the center axis of the motor is referred to as a "radial direction", and a direction along a circular arc having a center on the center axis of the motor is referred to as a "circumferential direction".

1. First Embodiment

Figure 1:
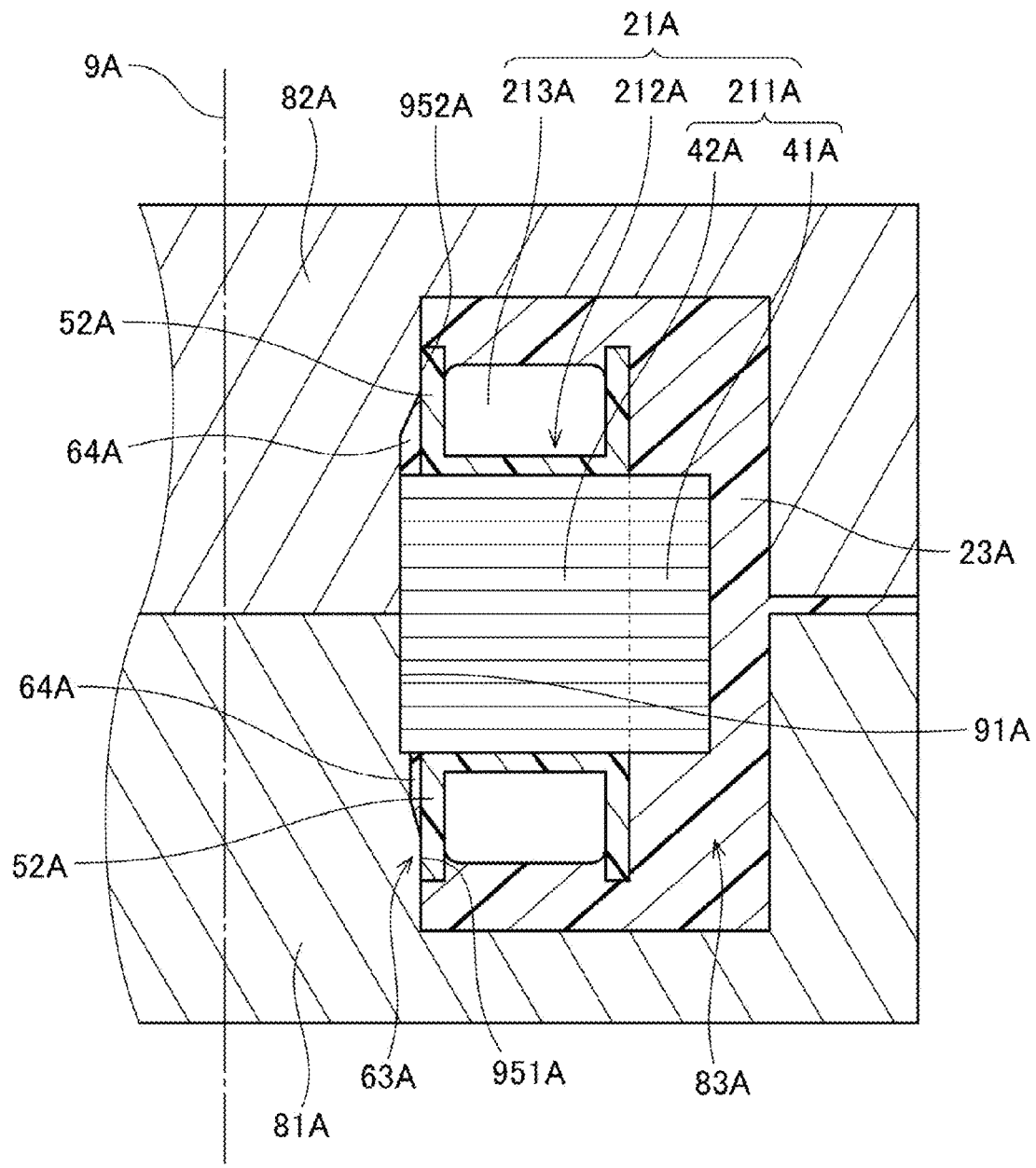
FIG. 1 is a partial sectional view showing an aspect when a resin casing according to a first embodiment is molded.

FIG. 1 is a partial sectional view showing an aspect when a resin casing 23A according to a first embodiment is molded. As shown in FIG. 1, the motor includes a stator 21A and a resin casing 23A that partially covers at least the stator 21A.

The stator 21A includes a stator core 211A, an insulator 212A, and coils 213A. The stator core 211A includes an annular core back 41A that surrounds a center axis 9A and a plurality of teeth 42A. Each of the plurality of teeth 42A extends inward from the core back 41A in the radial direction. The insulator 212A is mounted on at least the plurality of teeth 42A of the stator core 211A. The coils 213A are formed of conducting wires that are wound on the insulator 212A.

As shown in FIG. 1, the insulator 212A includes wall portions 52A. The wall portions 52A are positioned inside the coils 213A in the radial direction. Further, the wall portions 52A are provided around the teeth 42A and extend toward one side in the axial direction and the other side in the axial direction. Radially inner end portions of the teeth 42A protrude inward from radially inner surfaces of the wall portions 52A in the radial direction.

When the resin casing 23A is to be molded, first and second molds 81A and 82A for injection molding are prepared first. Further, the stator 21A is disposed in the first mold 81A. After that, the first and second molds 81A and 82A are combined with each other. When the first and second molds 81A and 82A are combined with each other, a cavity 83A is formed in the molds. The stator 21A is received in the cavity 83A.

Next, a resin, which is in a flowing state, is poured into the cavity 83A. Further, after the resin, which is in a flowing state, spreads into the cavity 83A, the resin is cured by heating and cooling. Accordingly, the resin casing 23A is obtained. After that, the first and second molds 81A and 82A are separated from each other. Then, the stator 21A and the resin casing 23A are taken out of the first mold 81A.

In this embodiment, the first mold 81A and the second mold 82A includes cylindrical surfaces 91A as shown in FIG. 1. The radially inner end faces of the teeth 42A come into contact with the cylindrical surfaces 91A. However, gaps, which are small enough that the resin cannot flow into the gaps, may be formed between the radially inner end faces of the teeth 42A and the cylindrical surfaces 91A. Further, the first mold 81A includes a wall supporting surface 951A on one side of the cylindrical surface 91A in the axial direction. Furthermore, the second mold 82A includes a wall supporting surface 952A on the other side of the cylindrical surface 91A in the axial direction. These wall supporting surfaces 951A and 952A are positioned outside the cylindrical surfaces 91A in the radial direction. When the stator 21A is disposed in the cavity 83A, the radially inner surfaces of the wall portions 52A come into contact with or face the wall supporting surfaces 951A and 952A in the radial direction.

The resin casing 23A, which has been molded, includes wall covering portions 64A that cover the radially inner surfaces of the wall portions 52A. A mold mark 63A, which is recessed from the radially inner surface of the wall covering portion 64A toward the outside in the radial direction, remains on the wall covering portion 64A. The mold mark 63A is a mark of the above-mentioned wall supporting surface 951A. Accordingly, the mold mark 63A reaches the outside of at least the radially inner end face of the tooth 42A in the radial direction.

In the step of pouring the resin, which is in a flowing state, into the cavity 83A, pressure, which is caused by the flow of the resin, is applied to the wall portions 52A of the insulator 212A. However, since the wall portions 52A come into contact with the wall supporting surfaces 951A even though the wall portions 52A are to collapse inward in the radial direction due to the pressure, the inward inclination of the wall portions 52A in the radial direction is limited. For this reason, excessive reduction in the thickness of the wall covering portion 64A is prevented. Accordingly, it is possible to suppress the occurrence of the peeling of the resin from the wall covering portions 64A after molding.

2. Second Embodiment

2-1. Entire Structure of Motor

Subsequently, a second embodiment of the invention will be described. While an axial direction is defined as a vertical direction and the side corresponding to a top plate portion 232 of a resin casing 23 relative to a rotor 32 is defined as an upper side, the shape and positional relationship of each portion will be described below. Meanwhile, "a lower side in the axial direction" in the following description corresponds to "one side in the axial direction." However, there is no intention to limit the direction at the time of manufacture and use of a motor according to at least an embodiment of the present invention by this definition of the vertical direction.

Figure 2:
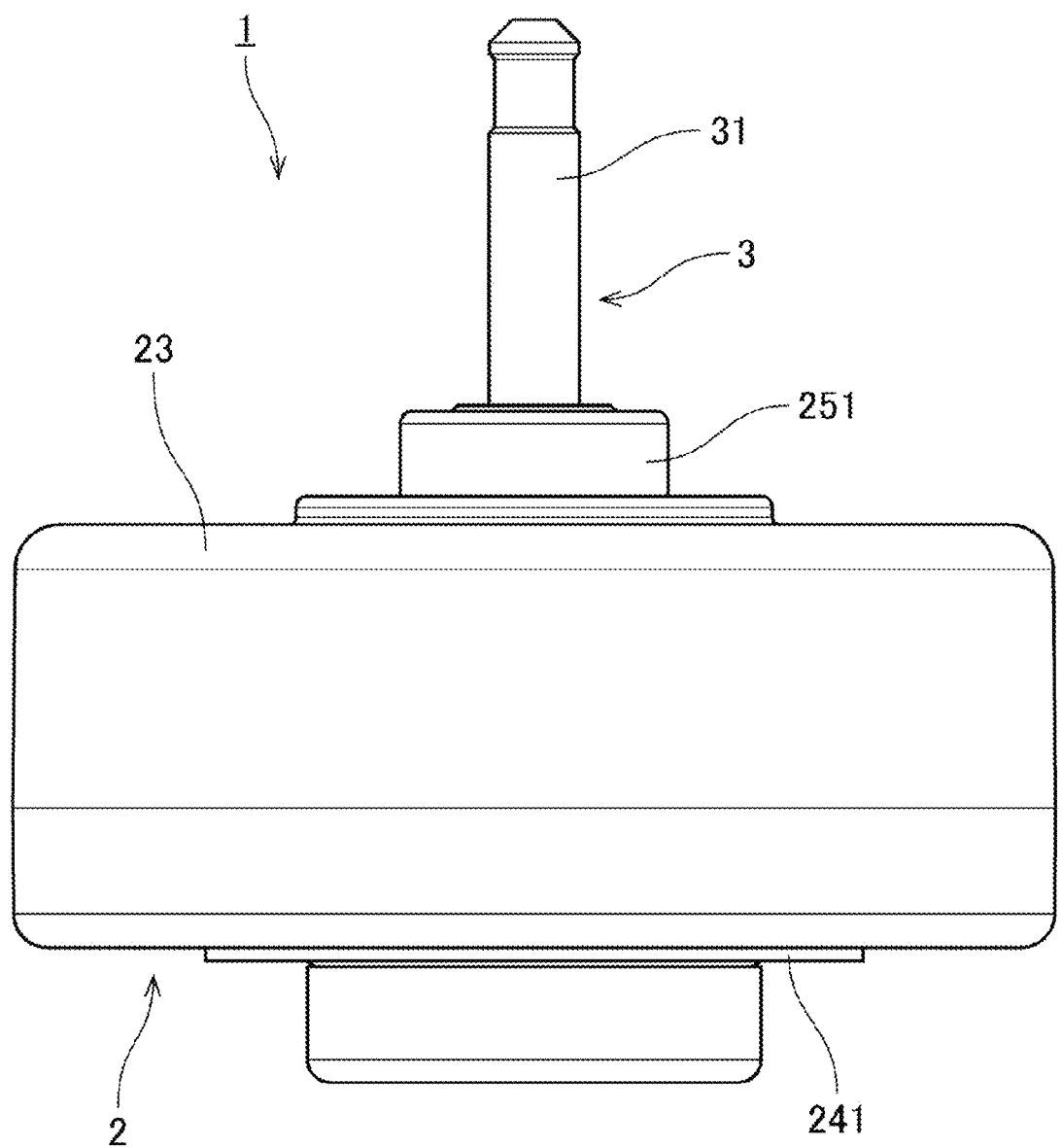
FIG. 2 is a side view of a motor according to a second embodiment.
Figure 3:
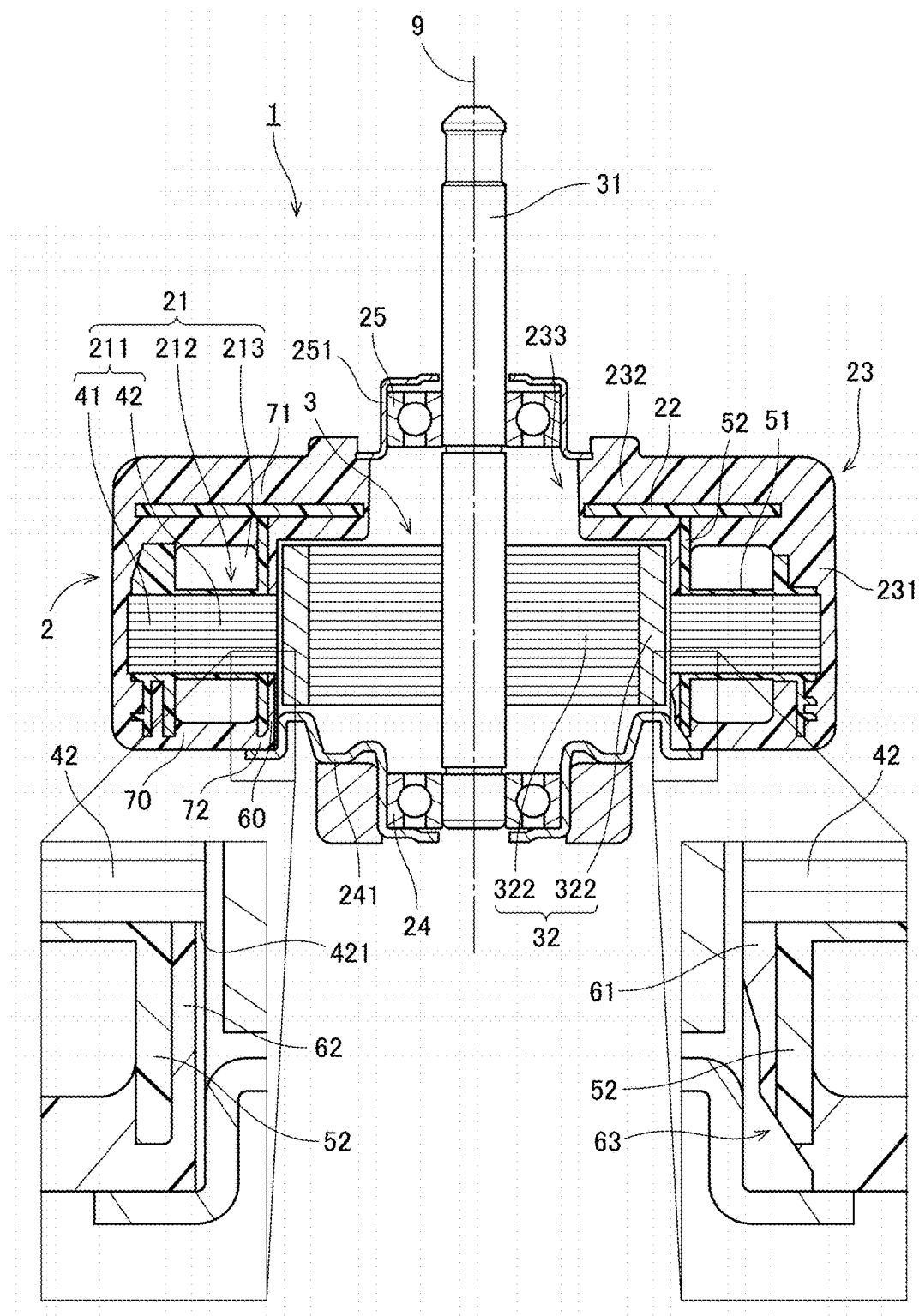
FIG. 3 is a longitudinal sectional view of the motor according to the second embodiment.

FIG. 2 is a side view of a motor 1 according to the second embodiment. FIG. 3 is a longitudinal sectional view of the motor 1. The motor 1 of this embodiment is used in home appliances such as an air conditioner. However, the motor may be used for a purpose other than in home appliances. For example, the motor may be mounted in transport machines, such as automobiles and trains, OA equipment, medical equipment, tools, large-sized industrial facilities, and the like to generate various driving forces.

As shown in FIGS. 2 and 3, the motor 1 includes a stationary unit 2 and a rotary unit 3. The stationary unit 2 is fixed to a frame of a home appliance. The rotary unit 3 is supported so as to be rotatable relative to the stationary unit 2.

The stationary unit 2 of this embodiment includes a stator 21, a circuit board 22, a resin casing 23, a lower bearing 24, and an upper bearing 25.

The stator 21 is an armature that generates a magnetic flux according to driving current. The stator 21 includes a stator core 211, an insulator 212, and a plurality of coils 213. The stator core 211 is formed of a laminated steel plate in which electromagnetic steel plates are laminated in the axial direction. The stator core 211 includes an annular core back 41 and a plurality of teeth 42. The core back 41 surrounds a center axis 9 and is disposed substantially coaxially with the center axis 9.

The stator core 211 of this embodiment is so-called split cores. That is, the core back 41 of the stator core 211 includes a plurality of core pieces that are arranged in the circumferential direction. The plurality of teeth 42 extend inward from the core pieces in the radial direction, respectively. Further, the plurality of teeth 42 are arranged at substantially regular intervals in the circumferential direction. However, a single annular stator core may be used instead of the split cores.

The insulator 212 is mounted on the stator core 211. A resin, which is an insulating material, is used as the material of the insulator 212. The insulator 212 includes teeth insulating portions 51 that cover at least both axial end faces and both circumferential faces of the respective teeth 42. The coils 213 are formed of conducting wires that are wound on the teeth insulating portions 51.

Figure 4:
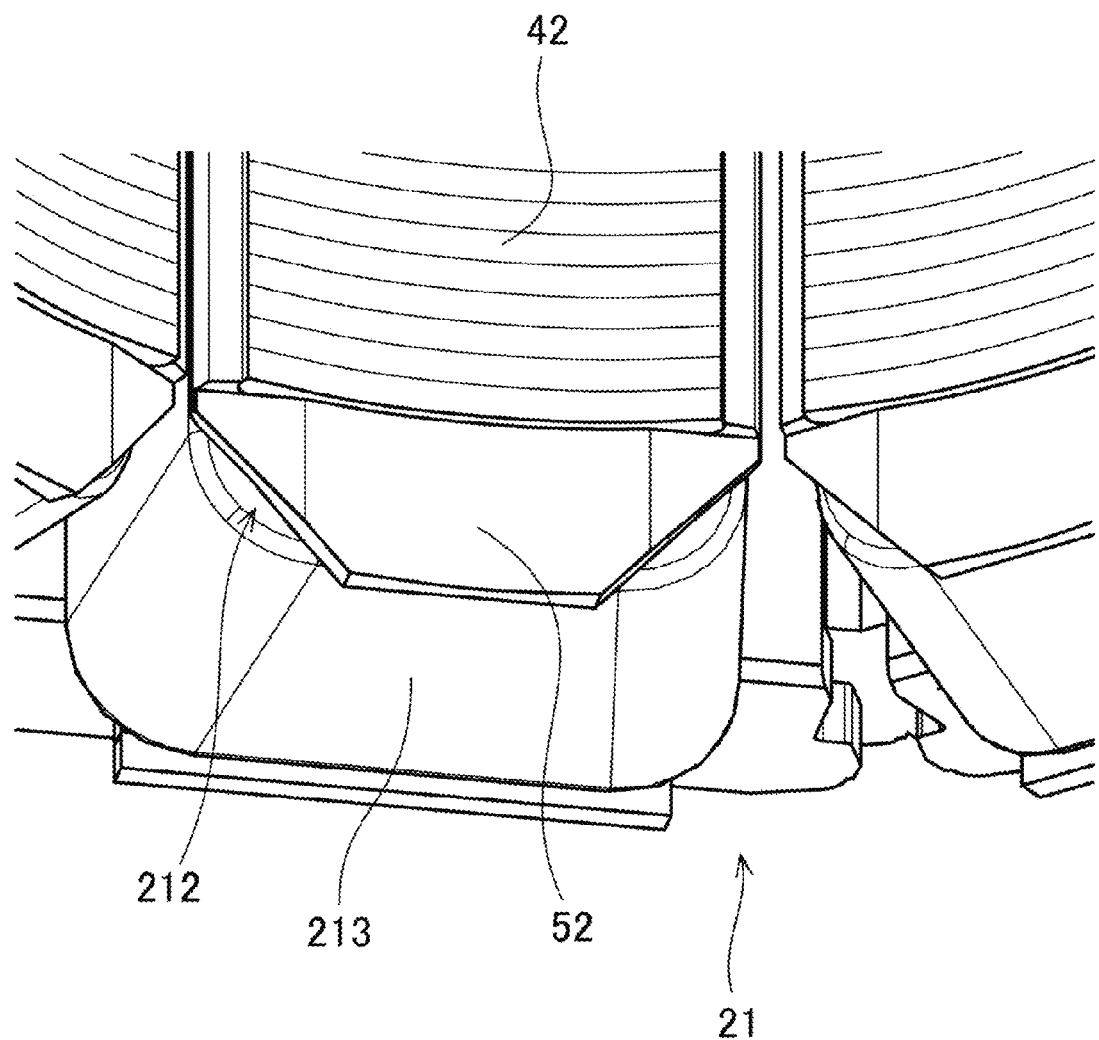
FIG. 4 is a perspective view of a part of a stator according to the second embodiment that is seen from the inside in a radial direction and the lower side in an axial direction.

FIG. 4 is a perspective view of a part of the stator 21 that is seen from the inside in the radial direction and the lower side in an axial direction. The resin casing 23 is not shown in FIG. 4. As shown in FIGS. 3 and 4, the insulator 212 includes wall portions 52 that are positioned inside the coils 213 in the radial direction. The wall portions 52 extend from radially inner end portions of the teeth insulating portions 51 toward the upper side and the lower side in the axial direction. The wall portions 52 suppress the collapse of the coils 213, and prevent the conducting wires, which form the coils 213, from protruding inward in the radial direction.

Further, as shown in FIGS. 3 and 4, radially inner end portions of the teeth 42 protrude inward from radially inner surfaces of the wall portions 52 in the radial direction. Accordingly, a part of radially inner portions of lower surfaces of the teeth 42 in the axial direction are positioned inside the radially inner surfaces of the wall portions 52 in the radial direction.

The circuit board 22 is positioned above the stator 21 in the axial direction, and is disposed substantially perpendicular to the center axis 9. The circuit board 22 is fixed to upper end portions of the wall portions 52 of the insulator 212 by, for example, welding. An electrical circuit, which supplies driving current to the coils 213, is mounted on the circuit board 22. End portions of the conducting wires, which form the coils 213, are electrically connected to the electrical circuit mounted on the circuit board 22. Current, which is supplied from an external power source, flows to the coils 213 through the circuit board 22.

The resin casing 23 is a member that holds the stator 21 and the circuit board 22 and is made of a resin. The resin casing 23 is obtained by pouring a resin into a cavity of a mold in which the stator 21 and the circuit board 22 are received. That is, the resin casing 23 is a resin molded article that uses the stator 21 and the circuit board 22 as insert components. Accordingly, the stator 21 and the circuit board 22 are at least partially covered with the resin casing 23.

The resin casing 23 of this embodiment includes a cylindrical portion 231 and a top plate portion 232. The cylindrical portion 231 extends in the axial direction so as to have a substantially cylindrical shape. At least the core back 41 of the stator 21 is covered with a resin that forms the cylindrical portion 231. Further, a rotor 32 to be described below is disposed at a radially inner portion of the cylindrical portion 231. The top plate portion 232 is provided above the stator core 211 and the rotor 32 in the axial direction, and extends inward from the cylindrical portion 231 in the radial direction. A circular hole 233 into which a shaft 31 to be described below is inserted is formed at the center of the top plate portion 232.

The lower bearing 24 is provided below the rotor 32 in the axial direction and supports the shaft 31 so as to allow the shaft 31 to be rotatable. The upper bearing 25 is provided above the rotor 32 in the axial direction and supports the shaft 31 so as to allow the shaft 31 to be rotatable. A ball bearing, which rotates an inner race through spherical bodies, is used as each of the lower and upper bearings 24 and 25 of this embodiment. An outer race of the lower bearing 24 is fixed to the cylindrical portion 231 of the resin casing 23 through a lower cover member 241 made of metal. An outer race of the upper bearing 25 is fixed to the top plate portion 232 of the resin casing 23 through an upper cover member 251 made of metal. However, other types of bearings, such as a sliding bearing and a fluid bearing, may be used instead of the ball bearing.

The rotary unit 3 of this embodiment includes a shaft 31 and a rotor 32.

The shaft 31 is a columnar member that extends in the axial direction. The shaft 31 is supported by the lower and upper bearings 24 and 25 and is rotated about the center axis 9. An upper end portion of the shaft 31 protrudes upward from an upper surface of the resin casing 23 in the axial direction. For example, a fan for an air conditioner is mounted on the upper end portion of the shaft 31. However, the shaft 31 may be connected to a drive unit other than the fan through a power transmission mechanism such as a gear.

Meanwhile, the shaft 31 of this embodiment protrudes upward from the resin casing 23 in the axial direction, but the invention is not limited thereto. The shaft 31 may protrude downward from the resin casing 23 in the axial direction and a lower end portion of the shaft 31 may be connected to a drive unit. Further, the shaft 31 may protrude upward and downward from the resin casing 23 in the axial direction, and both the upper and lower end portions of the shaft 31 may be connected to a drive unit.

The rotor 32 is fixed to the shaft 31, and is rotated together with the shaft 31. The rotor 32 includes a rotor core 321 and a plurality of magnets 322. The rotor core 321 is formed of a laminated steel plate in which electromagnetic steel plates are laminated in the axial direction. The plurality of magnets 322 are disposed on the outer peripheral surface of the rotor core 321. Radially outer surfaces of the respective magnets 322 form magnetic pole faces that face radially inner end faces of the teeth 42 in the radial direction. The plurality of magnets 322 are arranged at regular intervals in the circumferential direction so that magnetic pole faces corresponding to an N pole and magnetic pole faces corresponding to an S pole are alternately arranged.

Meanwhile, a single annular magnet may be used instead of the plurality of magnets 322. When an annular magnet is used, N poles and S poles have only to be alternately magnetized on the outer peripheral surface of the magnet. Further, the magnet may be embedded in the rotor core. Furthermore, the magnet may be molded from a resin with which magnetic material powder is mixed, and may be connected to the shaft 31.

When the motor 1 is driven, driving current is supplied to the coils 213 through the circuit board 22. In that case, a magnetic flux is generated in the plurality of teeth 42 of the stator core 211. Further, torque in the circumferential direction is generated by the action of the magnetic flux that is generated between the teeth 42 and the magnets 322. As a result, the rotary unit 3 is rotated about the center axis 9.

2-2. Regarding the Shape of the Resin Casing Near the Wall Portions

Figure 5:
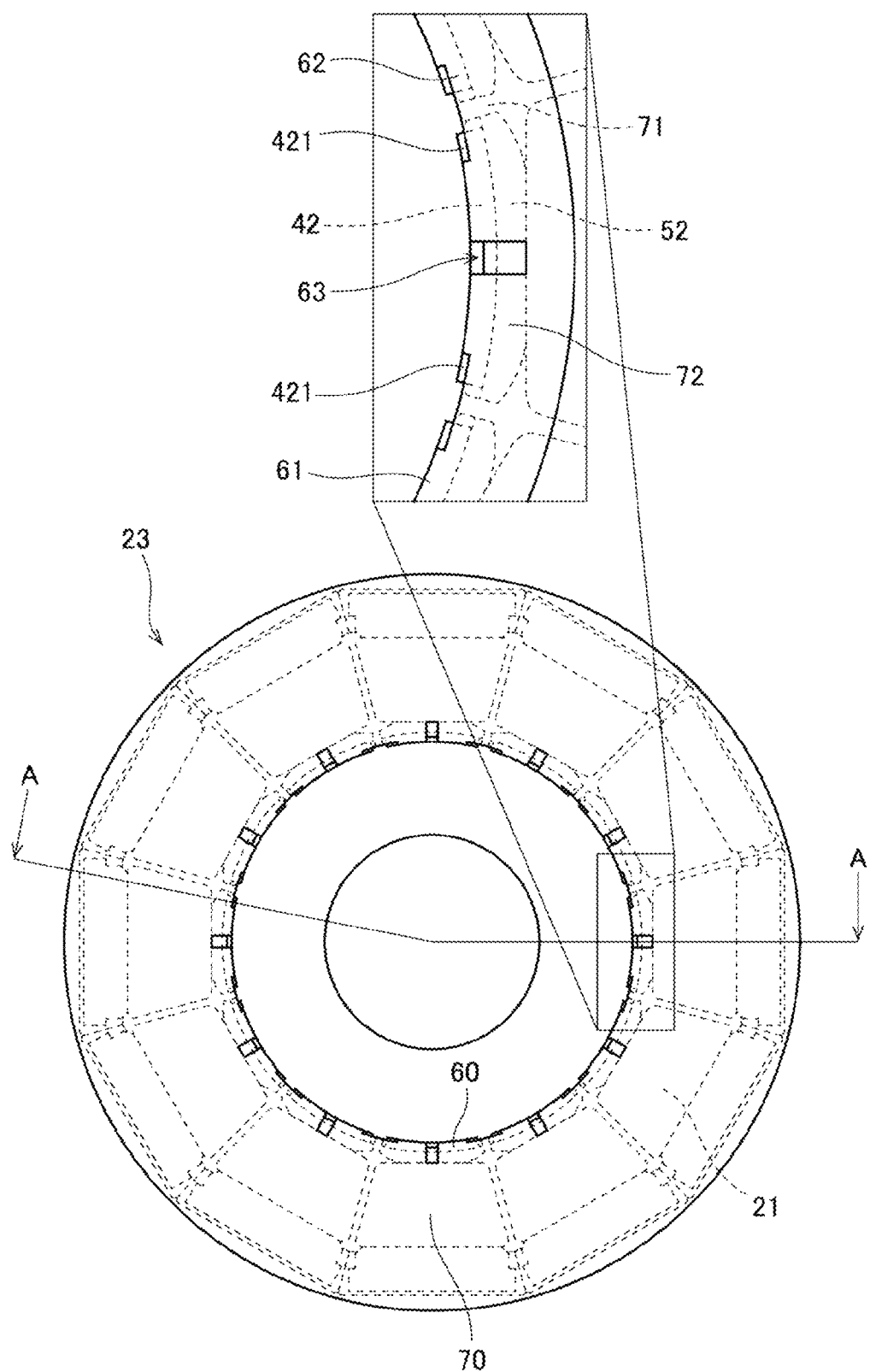
FIG. 5 is a bottom view of a resin casing according to the second embodiment.
Figure 6:
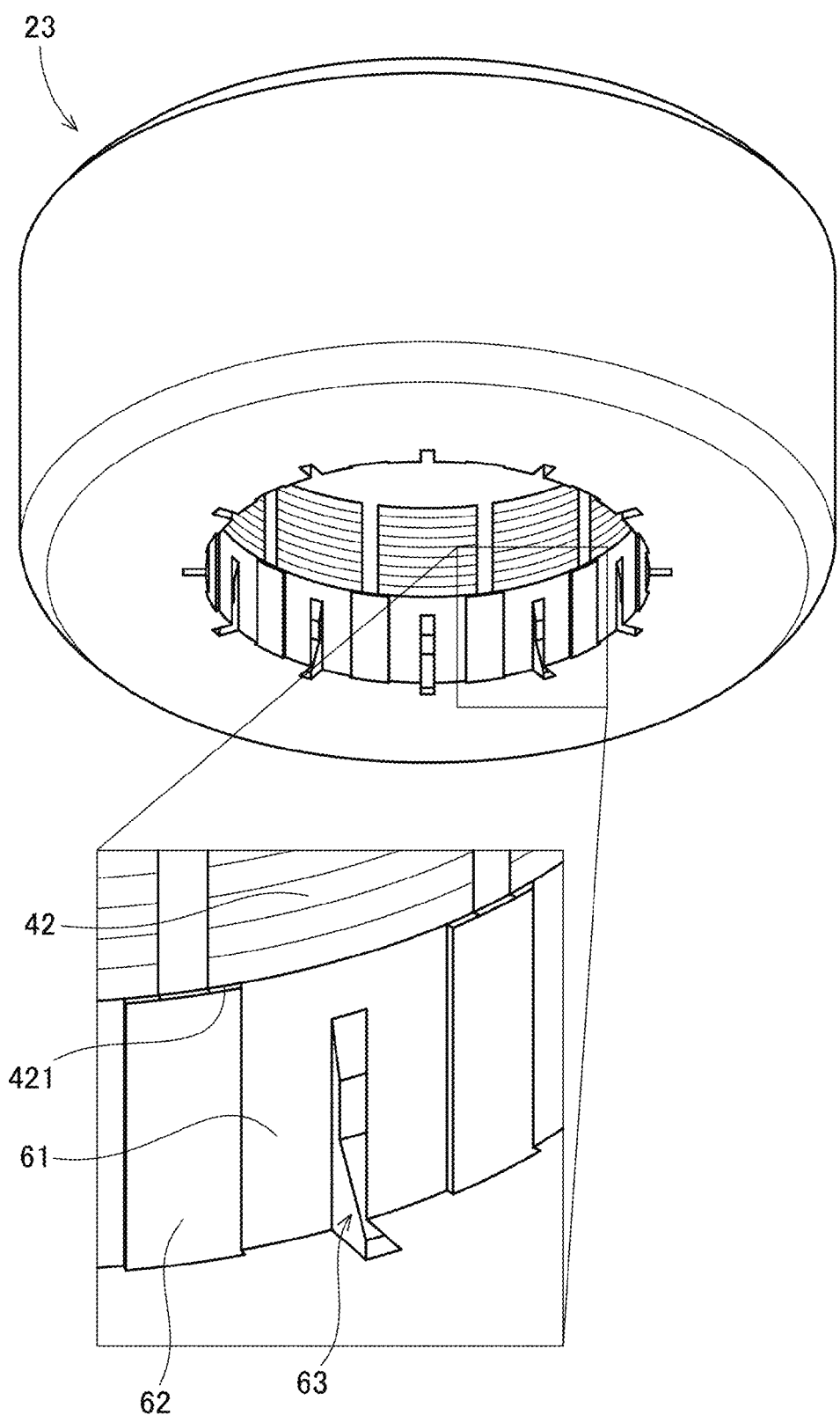
FIG. 6 is a perspective view of the resin casing according to the second embodiment that is obliquely seen from below.
Figure 7:
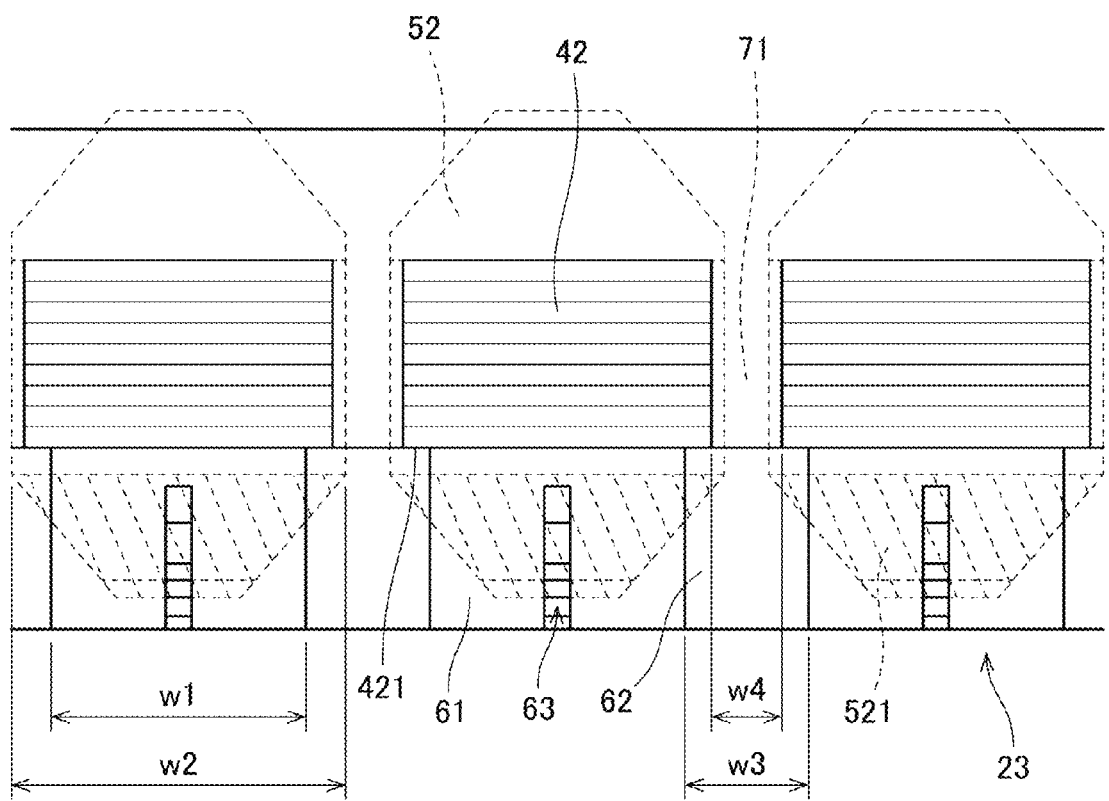
FIG. 7 is a view showing a part of an inner peripheral surface of the resin casing according to the second embodiment from the inside in the radial direction.

Subsequently, the shape of the resin casing 23 near the wall portions 52 will be described in more detail. FIG. 5 is a bottom view of the resin casing 23. FIG. 6 is a perspective view of the resin casing 23 that is obliquely seen from below. FIG. 7 is a view showing a part of an inner peripheral surface of the resin casing 23 from the inside in the radial direction. Meanwhile, the section of the resin casing 23 in FIG. 3 corresponds to the section taken along line A-A of FIG. 5.

As shown in FIGS. 3 and 5 to 7, the resin casing 23 includes an inner resin portion 60 and an outer resin portion 70. The inner resin portion 60 means an annular portion of the resin casing 23 that is positioned inside the wall portions 52 in the radial direction. The outer resin portion 70 means the entire portion of the resin casing 23 that is positioned outside the wall portions 52 in the radial direction. The inner and outer resin portions 60 and 70 are connected to each other. Accordingly, since the strength of the inner and outer resin portions 60 and 70 is increased overall, peeling of the inner resin portion 60 is suppressed.

The inner resin portion 60 includes a plurality of protruding portions 61 and a plurality of recessed portions 62 adjacent to the respective protruding portions 61 below the teeth 42 in the axial direction. Radially inner surfaces of the recessed portions 62 are positioned outside radially inner surfaces of the protruding portions 61 in the radial direction. In this embodiment, the protruding portions 61 and the recessed portions 62 are alternately arranged in the circumferential direction. Further, the plurality of protruding portions 61 and the plurality of recessed portions 62 are disposed at substantially regular angular intervals in the circumferential direction, respectively.

The number of the teeth 42, the number of the protruding portions 61, and the number of the recessed portions 62 are equal to each other (each of which is twelve in this embodiment). The plurality of protruding portions 61 and the wall portions 52 of the insulator 212 correspond to each other one to one. At least a part of each protruding portion 61 overlaps with the wall portion 52 in the radial direction. However, as shown in FIG. 7, a circumferential width w1 of the protruding portion 61 is smaller than the maximum circumferential width w2 of the wall portion 52. In this embodiment, the position of the middle of each wall portion 52 in the circumferential direction corresponds to the position of the middle of each protruding portion 61 in the circumferential direction. The protruding portions 61 and a part of the recessed portions 62, which are positioned on both sides of the protruding portions 61 in the circumferential direction, form wall covering portions that cover the radially inner surfaces of the wall portions 52.

As described above, in this embodiment, the protruding portion 61 is disposed inside each wall portion 52 in the radial direction. Accordingly, the radial thickness of the inner resin portion 60 inside the wall portion 52 in the radial direction is increased. As a result, the peeling of a resin, which is caused by degradation over time or the like, is suppressed inside the wall portion 52 in the radial direction.

In terms of the suppression of the peeling of a resin, it is preferable that the radial thickness of the protruding portion 61 be large. However, if the protruding portions 61 protrude inward from the radially inner end faces of the teeth 42 in the radial direction, there is a concern that the protruding portions 61 come into contact with the rotor 32. In this embodiment, as shown in a right enlarged view in FIG. 3, the radial positions of the radially inner end faces of the teeth 42 substantially correspond to the radial positions of the radially inner surfaces of the upper end portions of the protruding portions 61 coming into contact with the teeth 42. That is, the radially inner end faces of the teeth 42 are smoothly connected to the radially inner end faces of the protruding portions 61. Accordingly, while the protruding portions 61 are thick in the radial direction, the contact between the protruding portions 61 and the rotor 32 is prevented.

Further, mold marks 63, which are recessed from the radially inner surfaces of the protruding portions 61 toward the outside in the radial direction, are formed in the middle of the protruding portions 61 in the circumferential direction. The mold marks 63 are formed during a step of molding the resin casing 23 to be described below by support protrusions 95 of a first mold 81. Accordingly, the mold marks 63 are evidence that the inward inclination of the wall portions 52 in the radial direction is limited by the support protrusions 95 when the resin casing 23 is molded. The mold mark 63 of this embodiment reaches the outside of a radially outer end edge of an exposed surface 421, which will be described below, of the tooth 42 in the radial direction. However, the mold mark 63 has only to reach the outside of at least the radially inner end face of the tooth 42 in the radial direction.

The plurality of recessed portions 62 are disposed in a portion of the circumference extending over the adjacent teeth 42. That is, as shown in FIG. 7, a circumferential width w3 of each recessed portion 62 is larger than a circumferential width w4 of a gap between the adjacent teeth 42. Further, as shown in FIGS. 3 and 5 to 7, a lower end face of the tooth 42 in the axial direction is positioned inside the wall portion 52 in the radial direction and includes exposed surfaces 421 exposed from the inner resin portion 60. The exposed surface 421 is exposed in a space that is formed between the protruding portions 61 adjacent to each other in the circumferential direction and is present inside the recessed portion 62 in the radial direction. When the injection molding of the resin casing 23 to be described below is performed, stepped surfaces 92 of the first mold 81 come into contact with the exposed surfaces 421 of the teeth 42. Accordingly, the position of the stator 21 relative to the first mold 81 in the axial direction is determined.

Furthermore, the resin casing 23 includes slot-resin portions 71 and a lower end face-resin portion 72 in addition to the above-mentioned inner and outer resin portions 60 and 70. The slot-resin portion 71 means a portion of the resin casing 23 that is interposed between the wall portions 52 adjacent to each other in the circumferential direction. The lower end face-resin portion 72 means an annular portion of the resin casing 23 that is positioned below the wall portions 52 in the axial direction. The inner and outer resin portions 60 and 70 are connected to each other through the slot-resin portions 71 and the lower end face-resin portion 72.

In particular, in this embodiment, the slot-resin portions 71 are positioned outside the plurality of recessed portions 62 in the radial direction. Accordingly, a part of the recessed portions 62, a part of the slot-resin portions 71, and a part of the outer resin portion 70 are connected to each other in the radial direction. Therefore, the isolation of the recessed portion 62 is reduced, so that the peeling of a resin from the recessed portion 62 is further suppressed.

Further, in this embodiment, a part of lower portions of the plurality of protruding portions 61 and the plurality of recessed portions 62 in the axial direction, the lower end face-resin portion 72, and a part of the lower portion of the outer resin portion 70 in the axial direction are connected to each other in the radial direction. Accordingly, the isolation of the protruding portion 61 and the recessed portion 62 is further reduced, so that the peeling of a resin from the protruding portion 61 and the recessed portion 62 is further suppressed.

Furthermore, the wall portion 52 of this embodiment includes a converging portion 521 that is provided below the tooth 42 in the axial direction. The converging portion 521 is a portion that is shown in FIG. 7 by the hatching of a broken line. The converging portion 521 of this embodiment has a substantially trapezoidal shape when seen in the radial direction. The circumferential width of the converging portion 521 is gradually reduced toward the lower side in the axial direction. For this reason, the surface area of the wall portion 52 is smaller than that of a wall portion 52 of which the circumferential width is constant between the vicinity of the lower surface of the tooth 42 and the lower end portion of the wall portion 52. Further, the area of a portion of the wall portion 52, which protrudes from the coils 213 when seen in the radial direction, is reduced. Accordingly, the pressure of a resin, which is applied to the wall portion 52 when insert molding to be described below is performed, is reduced. Furthermore, since the converging portion 521 is formed, the amount of a resin material used to form the wall portion 52 is reduced.

As shown in FIG. 7, in this embodiment, both end sides of the protruding portion 61 in the circumferential direction cross both end sides of the converging portion 521 in the circumferential direction when seen in the radial direction. Further, the protruding portion 61 is connected to the outer resin portion 70 through portions of the slot-resin portions 71 that are positioned on both sides of the converging portion 521 in the circumferential direction. Accordingly, the peeling of a resin from the protruding portion 61 is further suppressed.

Furthermore, as shown in FIG. 7, in this embodiment, both end sides of the recessed portion 62 in the circumferential direction cross both end sides of the converging portion 521 in the circumferential direction when seen in the radial direction. Moreover, the recessed portion 62 is connected to the outer resin portion 70 through portions of the slot-resin portions 71 that are positioned on both sides of the converging portion 521 in the circumferential direction. Accordingly, the peeling of a resin from the recessed portion 62 is further suppressed.

2-3. Regarding a Method of Molding the Resin Casing

Figure 8:
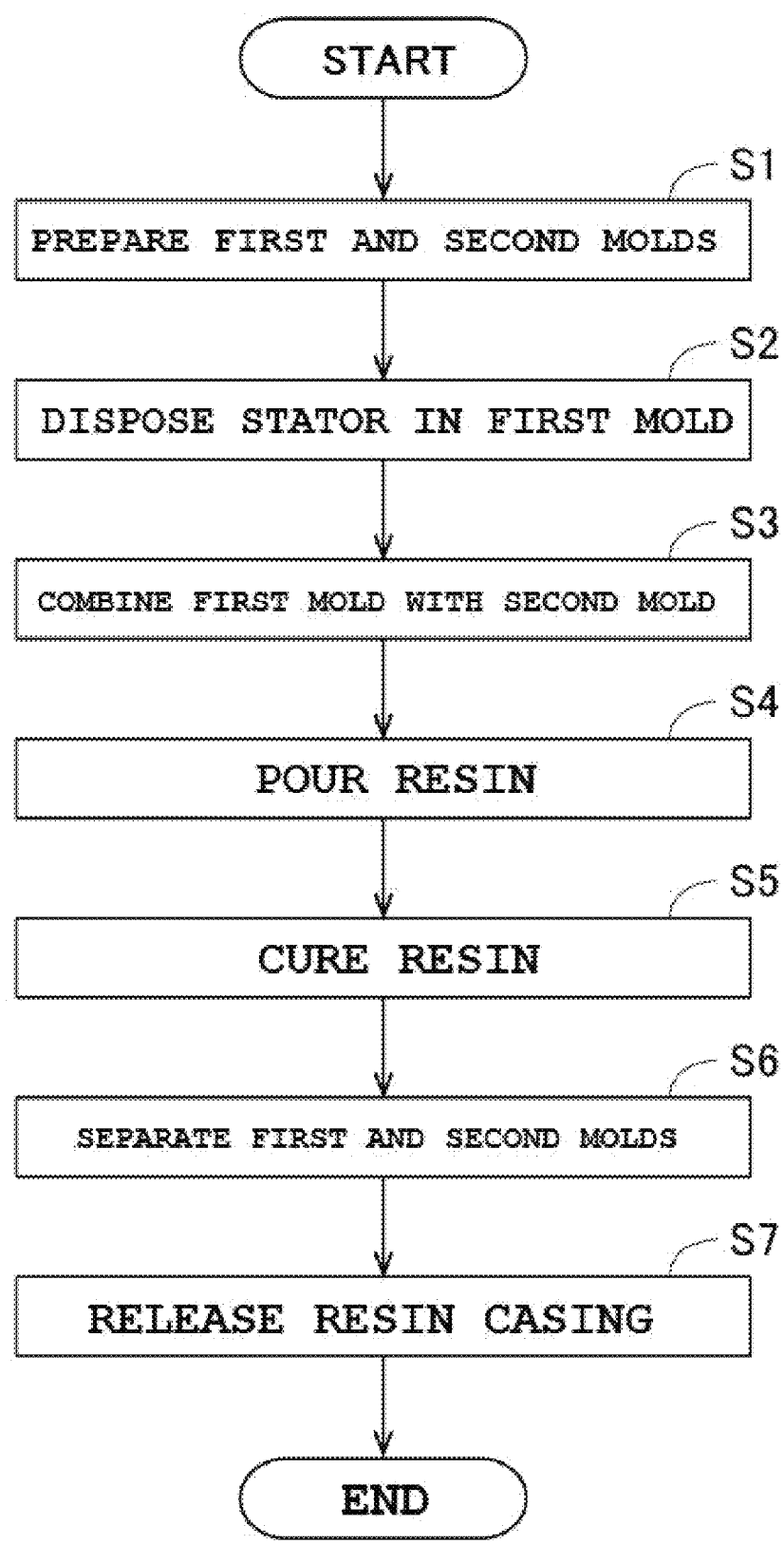
FIG. 8 is a flowchart illustrating a procedure for molding the resin casing according to the second embodiment.

Subsequently, a method of molding the resin casing 23 will be described. FIG. 8 is a flowchart illustrating a procedure for molding the resin casing 23. FIGS. 9 and 11 to 13 are sectional views showing an aspect when insert molding is performed.

Figure 9:
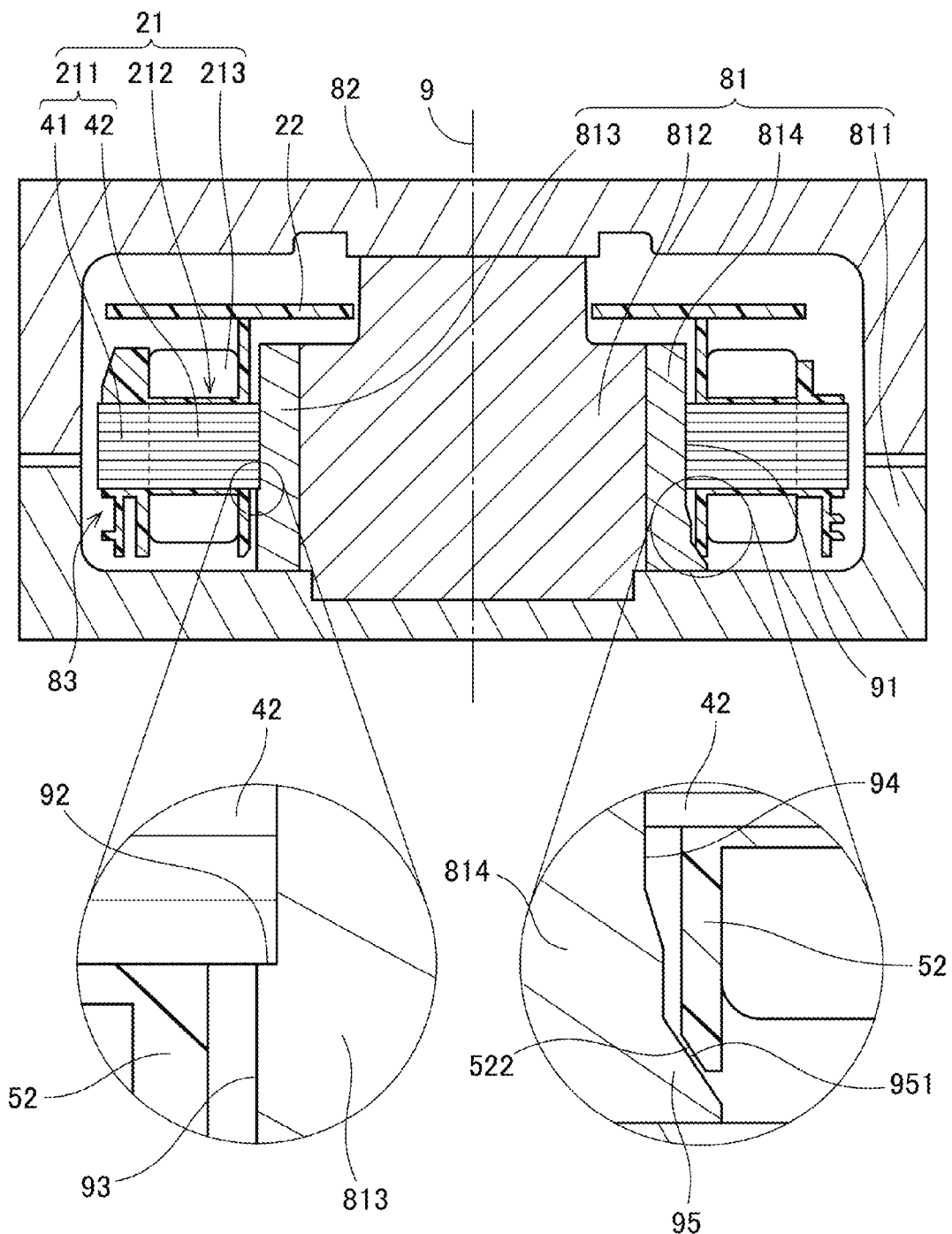
FIG. 9 is a sectional view showing an aspect when insert molding according to the second embodiment is performed.

When the resin casing 23 is to be molded, the first and second molds 81 and 82 for injection molding are prepared first (Step S1). A cavity 83, which corresponds to the shape of the resin casing 23 and is formed in the first and second molds 81 and 82 when the first and second molds 81 and 82 are combined with each other, is used. In this embodiment, the first and second molds 81 and 82 are disposed so as to face each other in the vertical direction as shown in FIG. 9. However, the first and second molds 81 and 82 may be disposed so as to face each other in a horizontal direction.

Next, the stator 21 and the circuit board 22 are disposed in the first mold 81 (Step S2). The circuit board 22 is fixed above the insulator 212 in advance. In Step S2, a unit, which includes the stator 21 and the circuit board 22, is inserted into the first mold 81.

Here, the structure of the first mold 81 will be described in detail. As shown in FIG. 9, the first mold 81 includes a base mold 811, a center mold 812, a plurality of first auxiliary molds 813, and a plurality of second auxiliary molds 814. The base mold 811 is a bottomed substantially cylindrical mold that is opened to the upper side in the axial direction. At least a part of the axially lower end face and the outer peripheral surface of the resin casing 23 are molded using the base mold 811. The center mold 812 is a substantially columnar mold that is disposed on the upper surface of the bottom of the base mold 811 so as to be substantially coaxial with the center axis 9. The plurality of first auxiliary molds 813 and the plurality of second auxiliary molds 814 are molds smaller than the center mold 812 and are mounted on the center mold 812. Meanwhile, the base mold 811 and the center mold 812 may be one continuous mold.

Figure 10:
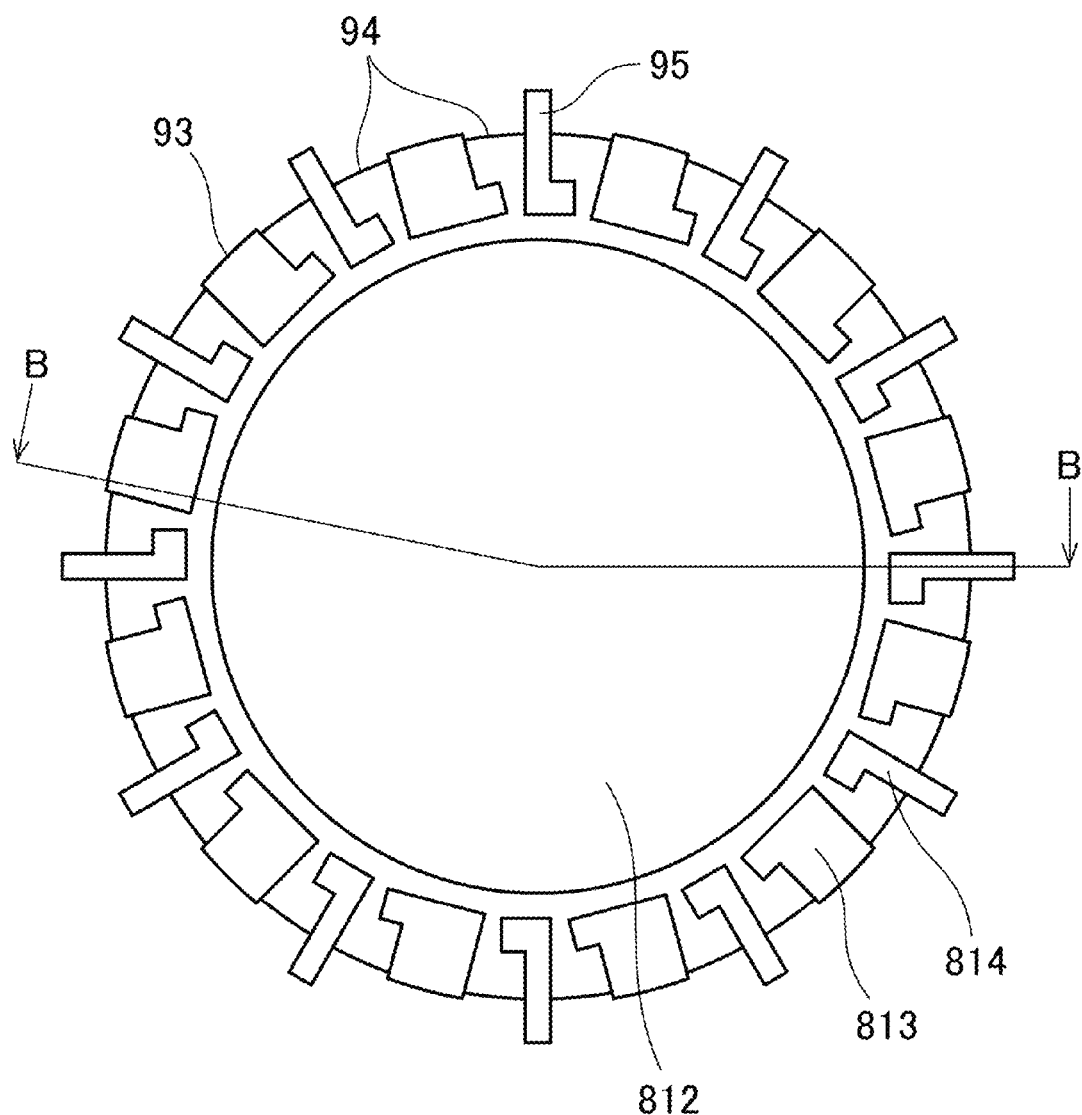
FIG. 10 is a bottom view of a center mold, a plurality of first auxiliary molds, and a plurality of second auxiliary molds according to the second embodiment.

FIG. 10 is a bottom view of the center mold 812, the plurality of first auxiliary molds 813, and the plurality of second auxiliary molds 814. The sections of the center mold 812, the plurality of first auxiliary molds 813, and the plurality of second auxiliary molds 814 shown in FIGS. 9 and 11 to 13 correspond to a section taken along line B-B of FIG. 10. As shown in FIG. 10, the first and second auxiliary molds 813 and 814 are fitted to grooves that are formed on the outer peripheral surface of the center mold 812. In this embodiment, the first and second auxiliary molds 813 and 814 are alternately arranged along the outer peripheral surface of the center mold 812 in the circumferential direction. Further, the plurality of first auxiliary molds 813 and the plurality of second auxiliary molds 814 are disposed at substantially regular angular intervals in the circumferential direction, respectively.

When the center mold 812, the plurality of first auxiliary molds 813, and the plurality of second auxiliary molds 814 are combined with each other, cylindrical surfaces 91, a plurality of stepped surfaces 92, a plurality of first opposite surfaces 93, a plurality of second opposite surfaces 94, and support protrusions 95 are formed on the outer peripheral surface of a mold group of these molds.

The cylindrical surfaces 91 are substantially cylindrical surfaces that face the radially inner end faces of the teeth 42 after the completion of Step S2. In Step S2, the radially inner end faces of the plurality of teeth 42 come into contact with the cylindrical surfaces 91. Accordingly, in the first mold 81, the stator 21 is positioned substantially coaxially with the center axis 9. In this embodiment, the cylindrical surfaces 91, which are continuous in the circumferential direction, are formed by the center mold 812, the plurality of first auxiliary molds 813, and the plurality of second auxiliary molds 814.

The plurality of stepped surfaces 92 are surfaces that slightly protrude from the lower end portions of the cylindrical surfaces 91 toward the outside in the radial direction. The plurality of stepped surfaces 92 are disposed at substantially regular angular intervals in the circumferential direction. In Step S2, an axially lower end face of a portion, which protrudes inward from the wall portion 52 in the radial direction, of each of the teeth 42 comes into contact with each of the plurality of stepped surfaces 92. Accordingly, the stator 21 is positioned relative to the first mold 81 in the axial direction.

Particularly, in this embodiment, the plurality of stepped surfaces 92 are equally disposed around the center axis 9. For this reason, the inclination of the stator 21 is suppressed as compared to a case in which the plurality of stepped surfaces 92 are not equally disposed around the center axis 9. Accordingly, it is possible to further suppress excessive reduction in the thickness of a part of the inner resin portion 60 after molding.

The plurality of first opposite surfaces 93 extend downward from the radially outer end edges of the stepped surfaces 92 in the axial direction. Accordingly, the first opposite surfaces 93 are positioned outside the cylindrical surfaces 91 in the radial direction. The plurality of first opposite surfaces 93 are disposed at substantially regular angular intervals in the circumferential direction. In Step S2, the radially inner surfaces of the wall portions 52 and the first opposite surfaces 93 partially face each other in the radial direction. After the completion of Step S2, the first opposite surfaces 93 are disposed in a portion of the circumference extending over the adjacent teeth 42. That is, the circumferential width of each of the first opposite surfaces 93 is larger than the circumferential width of the gap between the adjacent teeth 42.

The plurality of second opposite surfaces 94 are disposed adjacent to both sides of the first opposite surfaces 93 in the circumferential direction. In this embodiment, the first and second opposite surfaces 93 and 94 are alternately arranged in the circumferential direction. The respective second opposite surfaces 94 are positioned inside the first opposite surfaces 93 in the radial direction. In this embodiment, the cylindrical surfaces 91 and the second opposite surfaces 94 are disposed at the same positions in the radial direction. After the completion of Step S2, the radially inner surfaces of the wall portions 52 and the second opposite surfaces 94 partially overlap with each other in the radial direction. However, the circumferential width of the second opposite surface 94 is smaller than the maximum circumferential width of the wall portion 52.

The support protrusions 95 protrude outward from the second opposite surface 94 in the radial direction. The support protrusion 95 includes a wall supporting surface 951 at an outer portion thereof in the radial direction. The wall supporting surface 951 is positioned outside the cylindrical surface 91 in the radial direction. In Step S2, the radially inner surfaces of the wall portions 52 and the wall supporting surfaces 951 come into contact with each other or face each other in the radial direction.

In this embodiment, the wall supporting surfaces 951 are inclined in a direction away from the center axis toward the lower side in the axial direction as shown in a right enlarged view in FIG. 9. In this case, when the stator 21 is inserted into the first mold 81, the wall supporting surfaces 951 do not easily cause insertion resistance. Further, when lower end portions of some wall portions 52 are moved down along the wall supporting surfaces 951, the wall supporting surfaces 951 and the wall portions 52 are positioned coaxially. That is, work for inserting the stator 21 into the first mold 81 becomes easy. Furthermore, since the wall supporting surfaces 951 are inclined, releasing work in Step S7 to be described below also becomes easy.

Particularly, inclined surfaces 522 are also formed on the radially inner surfaces of the wall portions 52 in this embodiment. The inclined surfaces 522 of the wall portions 52 are inclined in a direction away from the center axis 9 toward the lower side in the axial direction. In Step S2, the wall supporting surfaces 951 of the support protrusions 95 and the inclined surfaces 522 of the wall portions 52 come into contact with each other or face each other. Since the inclined surfaces 522 are also formed on the wall portions 52 as described above, work for inserting the stator 21 in Step S2 and releasing work in Step S7 become easier.

In this embodiment, the stepped surfaces 92 and the first opposite surfaces 93 do not belong to the center mold 812 and belong to the first auxiliary mold 813 which is smaller than the center mold 812. For this reason, each of the stepped surfaces 92 and each of the first opposite surfaces 93 are accurately formed as compared to a case in which the stepped surfaces 92 and the first opposite surfaces 93 are formed on the center mold 812 itself. Further, in this embodiment, the support protrusions 95 including the wall supporting surfaces 951 belong to the second auxiliary mold 814. For this reason, each of the support protrusions 95 is accurately formed as compared to a case in which the support protrusions 95 are formed on the center mold 812 itself. Accordingly, portions, which are molded by these portions, are more accurately molded.

After the stator 21 and the circuit board 22 are completely disposed in the first mold 81, the first and second molds 81 and 82 are combined with each other (Step S3). That is, the second mold 82 approaches the first mold 81 from the upper side of the first mold 81 in the axial direction, and the upper portion of the first mold 81 is closed with the second mold 82. Accordingly, the cavity 83 is formed between the first and second molds 81 and 82 and the stator 21 and the circuit board 22 are received in the cavity 83 as shown in FIG. 9.

In this case, as shown in the right enlarged view in FIG. 9, the axially lower end face of the tooth 42 is spaced apart from the axially upper end portion of the support protrusion 95 in the axial direction. That is, the support protrusion 95 does not come into contact with the tooth 42. Accordingly, an axially lower end face of a portion, which protrudes inward from the wall portion 52 in the radial direction, of the tooth 42 comes into contact with only the stepped surface 92. For this reason, the positional deviation of the stator 21, which is caused by contact with the support protrusion 95, does not occur.

Figure 11:
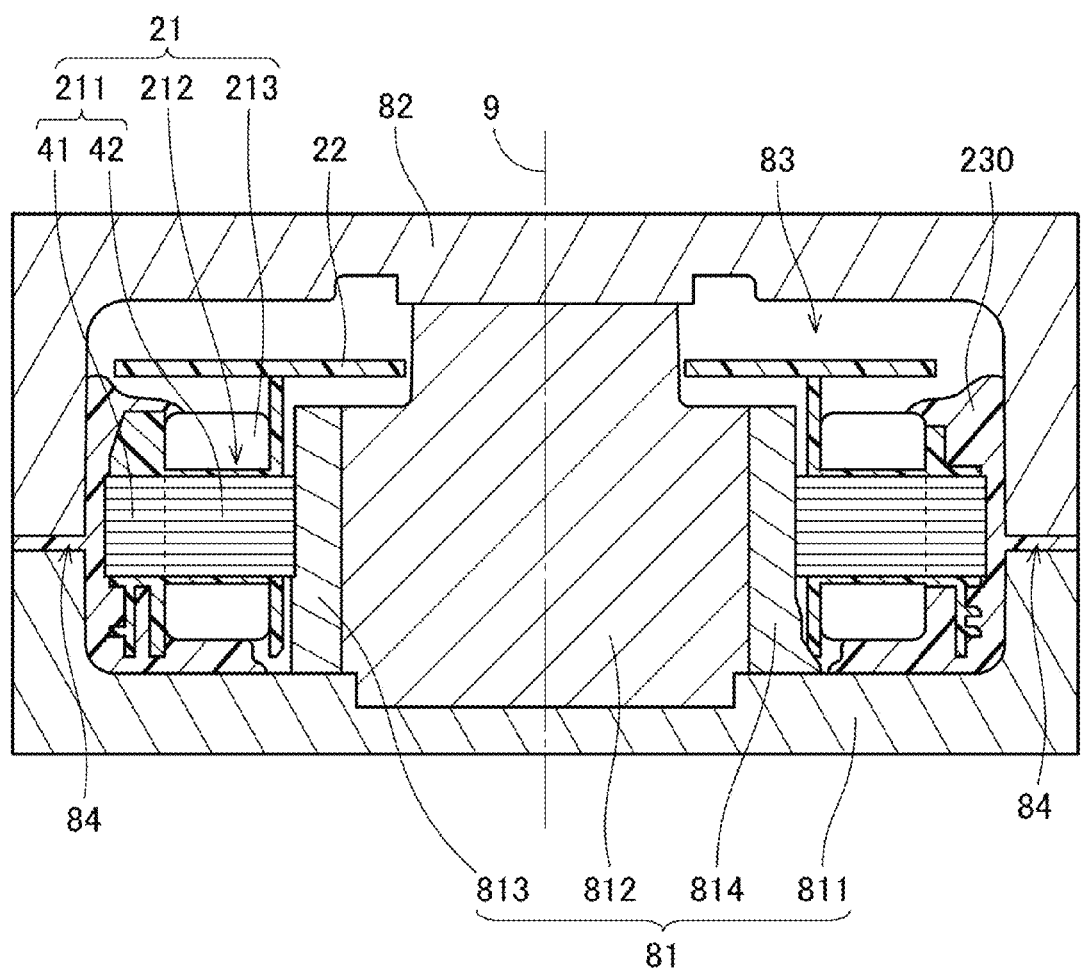
FIG. 11 is a sectional view showing an aspect when insert molding according to the second embodiment is performed.

Subsequently, a resin 230, which is in a flowing state, is poured into the cavity 83 (Step S4). Here, as shown in FIG. 11, the resin 230, which is in a flowing state, is poured into the cavity 83 from a gate 84 that is formed near a contact surface between the first and second molds 81 and 82. The poured resin 230 spreads into the entire cavity 83. At this time, radially inward pressure is applied to the wall portion 52 by the force of the flow of the resin 230. However, when a portion of the wall portion 52, which is present below the tooth 42 in the axial direction, is to collapse inward in the radial direction, the inclined surface 522 of the wall portion 52 comes into contact with the wall supporting surface 951 of the first mold 81. Accordingly, the inward inclination of the wall portion 52 in the radial direction is suppressed.

A portion, which is displaced most when receiving pressure from the resin 230, of the wall portion 52 below the tooth 42 in the axial direction is an axially lower end edge of the converging portion 521. In this embodiment, at least the axially lower end edge of the converging portion 521 overlaps with the wall supporting surface 951 in the radial direction after the completion of the above-mentioned Step S2. Accordingly, the inward displacement of the end edge in the radial direction is suppressed by the contact between the wall supporting surface 951 and the wall converging portion 521. Accordingly, the inward inclination of the wall portion 52 in the radial direction is further suppressed.

Further, in this embodiment, the support protrusion 95 protrudes so as to have a substantially rectangular shape in top view or bottom view. For this reason, a contact portion between the wall supporting surface 951 and the inclined surface 522 of the wall portion 52 extends in the circumferential direction. That is, the wall supporting surface 951 and the inclined surface 522 come into surface contact with each other. Accordingly, the contact area between the wall supporting surface 951 and the inclined surface 522 is increased. Therefore, the inward inclination of the wall portion 52 in the radial direction is further suppressed.

Figure 12:
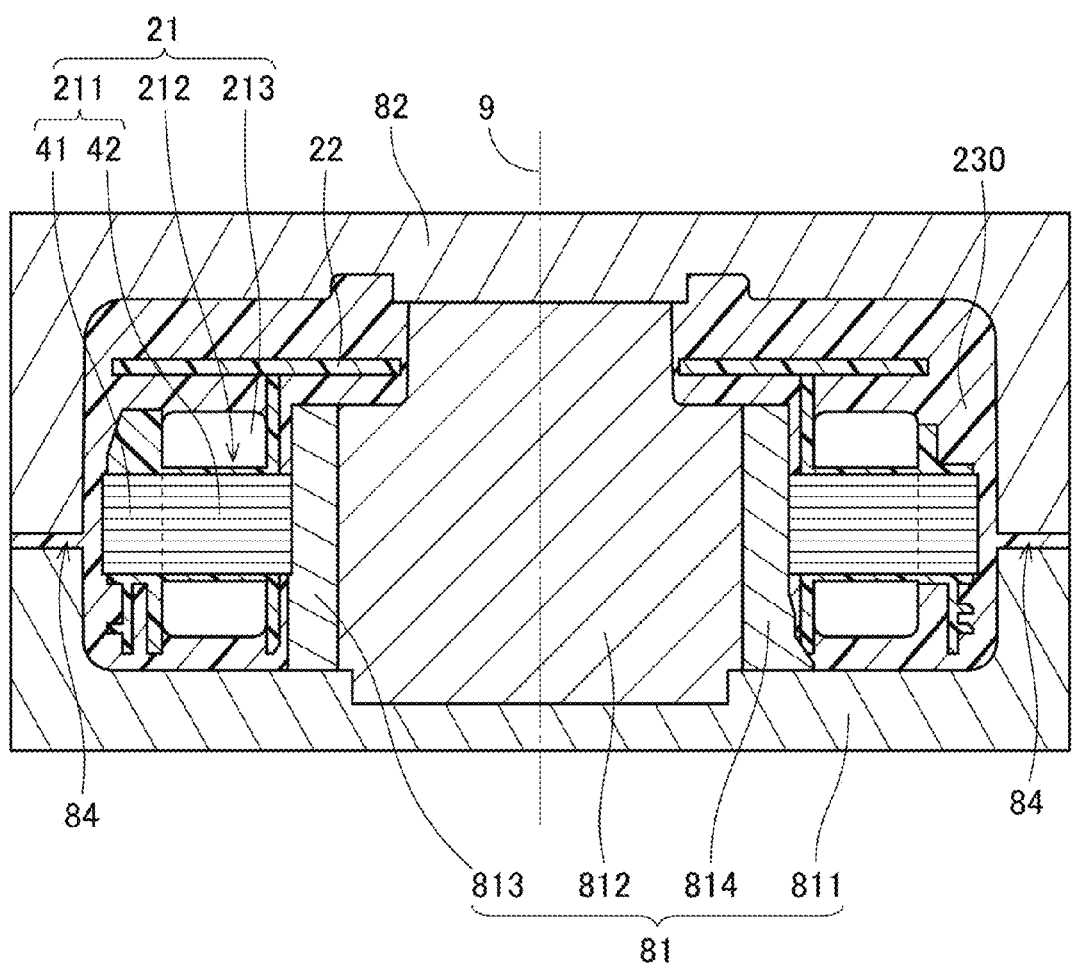
FIG. 12 is a sectional view showing an aspect when insert molding according to the second embodiment is performed.

When the resin 230, which is in a flowing state, spreads into the cavity 83 as shown in FIG. 12, the resin 230 present in the cavity 83 is subsequently cured (Step S5). For example, when a thermosetting resin is used, the resin present in the cavity 83 is cured by being heated. Further, when a thermoplastic resin is used, the resin present in the cavity 83 is cured by being cooled. The resin 230 present in the cavity 83 forms the resin casing 23 by being cured.

A portion of the axially lower end face of the tooth 42, which comes into contact with the stepped surface 92 of the first mold 81, forms the exposed surface 421 after the resin 230 is cured. Further, the first opposite surfaces 93, the second opposite surfaces 94, and the support protrusions 95 of the first mold 81 mold the recessed portions 62, the protruding portions 61, and the mold marks 63 of the resin casing 23, respectively.

As described above, in the molding method of this embodiment, the wall supporting surface 951 of the first mold 81 suppresses the inward inclination of the wall portion 52 in the radial direction. When the inward inclination of the wall portion 52 in the radial direction is suppressed, it is possible to ensure the radial thickness of a resin inside the wall portion 52. That is, it is possible to suppress reduction in the radial thickness of the inner resin portion 60 after molding. In particular, the radial thickness of the recessed portion 62, which is molded between the first opposite surface 93 and the wall portion 52, is originally smaller than the radial thickness of the protruding portion 61, but it is possible to suppress excessive reduction in the radial thickness of the recessed portion 62. As a result, it is possible to further suppress the peeling of a molded resin from the radially inner surface of the wall portion 52.

Further, the protruding portion 61 of which the radial thickness is larger than the radial thickness of the recessed portion 62 is molded between the wall portion 52 and the second opposite surface 94. Accordingly, it is possible to further suppress the peeling of a molded resin from the radially inner surface of the wall portion 52.

Figure 13:
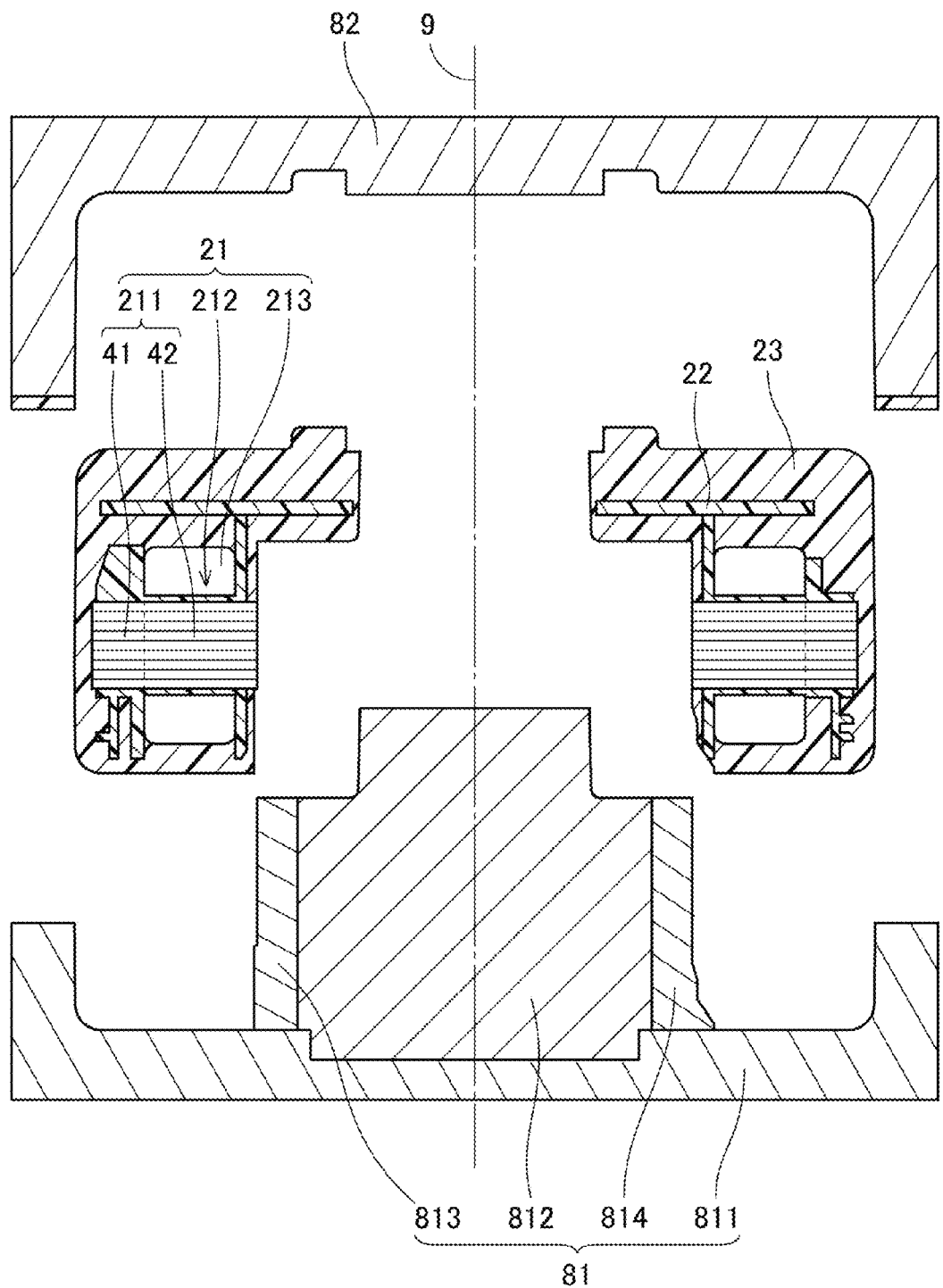
FIG. 13 is a sectional view showing an aspect when insert molding according to the second embodiment is performed.

When the resin 230 is completely cured, the first and second molds 81 and 82 are then separated (Step S6). Specifically, the second mold 82 is moved up, so that the second mold 82 is separated from the first mold 81 and the upper portion of the first mold 81 is opened. After that, the resin casing 23, which covers the stator 21 and the circuit board 22, is taken out of the first mold 81 as shown in FIG. 13 (Step S7).

Meanwhile, in Step S6, pins protrude downward from the second mold 82 so as to facilitate the release of the resin casing 23 from the second mold 82. Further, in Step S7, pins protrude upward from the first mold 81 so as to facilitate the release of the resin casing 23 from the first mold 81.

3. Modification

The exemplary embodiments of the invention have been described above, but the invention is not limited thereto.

Figure 14:
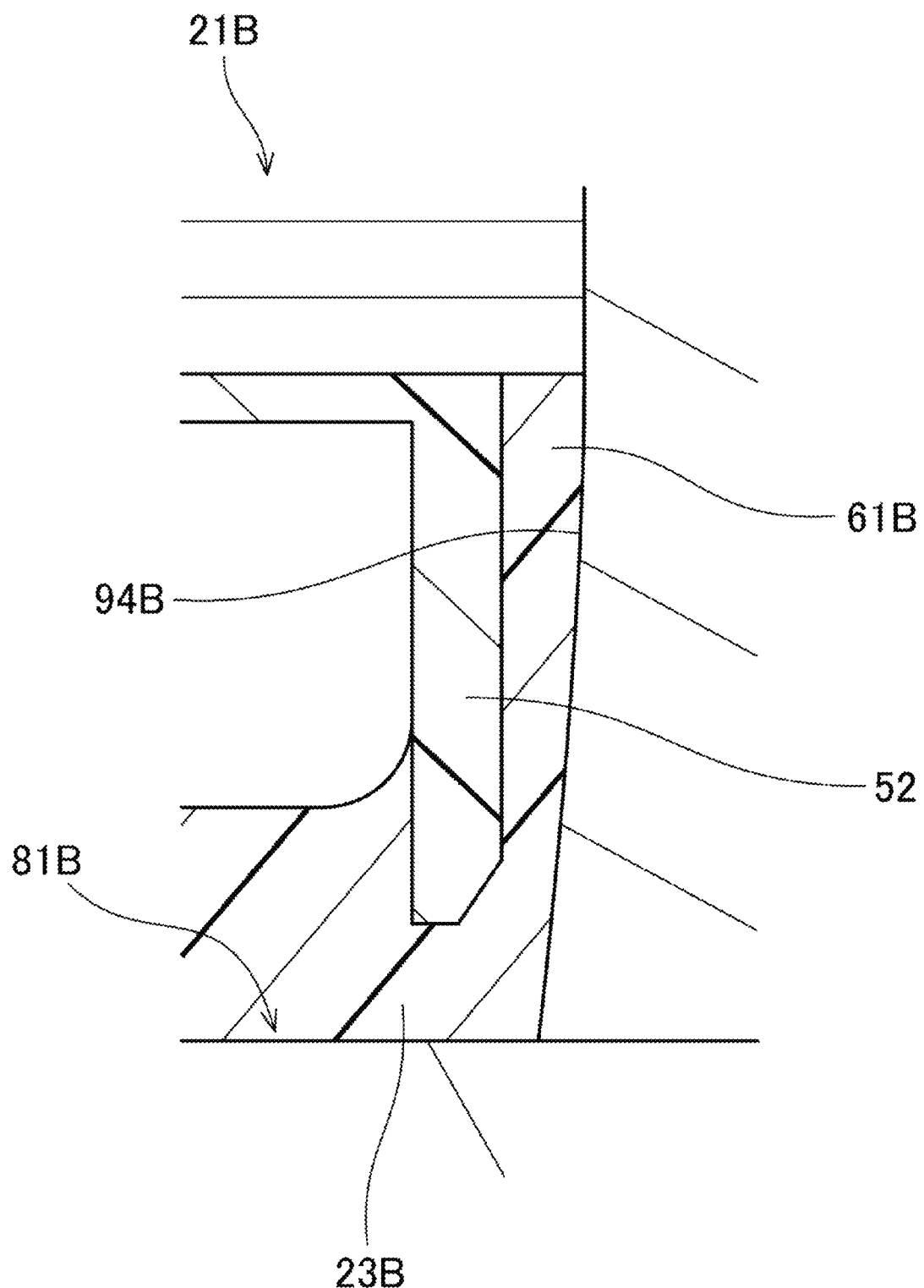
FIG. 14 is a partial sectional view of a first mold, a stator, and a resin casing according to a modification when molding is performed.

FIG. 14 is a partial sectional view of a first mold 81B, a stator 21B, and a resin casing 23B according to a modification when molding is performed. In the example of FIG. 14, a second opposite surface 94B of the first mold 81B is inclined in a direction away from a center axis toward the lower side in the axial direction. Accordingly, a radially inner surface of a protruding portion 61B of the resin casing 23B, which has been molded, is inclined in a direction away from the center axis toward the lower side in the axial direction. When the second opposite surface 94B is formed in a tapered shape as described above, the resin casing 23B is easily released from the first mold 81B after the resin is cured. Meanwhile, the first opposite surface may also be formed in a tapered shape likewise.

Further, in the second embodiment, both the stator and the circuit board have been covered with the resin casing. However, the circuit board may be disposed outside the resin casing. For example, the circuit board may be fixed to an upper portion of the resin casing in the axial direction after the resin casing is molded.

Furthermore, the cylindrical surfaces have been formed on the first mold in the second embodiment. However, the cylindrical surfaces may be formed on the second mold, and may be formed on both the first and second molds. That is, the cylindrical surfaces, which come into contact with the radially inner end faces of the teeth, may be formed on at least one of the first and second molds.

Moreover, in the second embodiment, the position of the first mold has been fixed and the second mold has been adapted to be moved relative to the first mold so that the mold is opened and closed. However, the position of the second mold may be fixed and the first mold may be adapted to be moved relative to the second mold.

Further, in the second embodiment, the plurality of protruding portions, the plurality of recessed portions, and the mold marks have been formed on only a portion of the inner resin portion that is present below the teeth in the axial direction. However, the same plurality of protruding portions, the same plurality of recessed portions, and the same mold marks may also be formed on a portion of the inner resin portion that is present above the teeth in the axial direction.

Furthermore, the detailed shapes of the respective member may be different from the shapes shown in the respective drawings of this specification. Moreover, the respective elements shown in the embodiments and the modification may be appropriately combined with each other so that contradiction does not occur.

At least an embodiment of the present invention can be used in a method of molding a resin casing that partially covers at least a stator of a motor and the motor.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
    a stator; and
    a resin casing that partially covers at least the stator,
    wherein the stator comprises a stator core, an insulator, and a coil,
    the stator core comprises an annular core back that surrounds a center axis and a plurality of teeth that extend inward from the annular core back in a radial direction,
    the insulator is mounted on at least the plurality of teeth,
    the coil is formed of a conducting wire that is wound on the insulator,
    the insulator comprises wall portions that are positioned inside the coil in the radial direction,
    the wall portions are provided around the plurality of teeth and extend toward at least one side in an axial direction,
    radially inner end portions of the plurality of teeth protrude inward from radially inner surfaces of the wall portions in the radial direction,
    the resin casing comprises wall covering portions that cover the radially inner surfaces of the wall portions,
    the wall covering portions include mold marks that are recessed from radially inner surfaces thereof toward an outside in the radial direction, and
    the mold marks reach an outside of at least radially inner end faces of the plurality of teeth in the radial direction.

2. The motor according to claim 1,
    wherein one-axial-side end faces of the plurality of teeth are positioned inside the wall portions in the radial direction and include exposed surfaces that are exposed from the wall covering portions, and
    the mold marks reach the outside of radially outer end edges of the exposed surfaces in the radial direction.

* * * * *